(12) United States Patent
Hirata et al.

(10) Patent No.: US 7,971,928 B2
(45) Date of Patent: Jul. 5, 2011

(54) DRIVE APPRATUS FOR SUNROOF

(75) Inventors: Tetsuya Hirata, Toyota (JP); Takashi Okamura, Iwakura (JP); Shohei Kobata, Anjo (JP); Chitose Nishiyama, Handa (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 12/292,456

(22) Filed: Nov. 19, 2008

(65) Prior Publication Data
US 2009/0134672 A1 May 28, 2009

(30) Foreign Application Priority Data

Nov. 22, 2007 (JP) ................................. 2007-303200

(51) Int. Cl.
*B60J 7/057* (2006.01)
(52) U.S. Cl. .................................................. 296/223
(58) Field of Classification Search .............. 296/223; 74/22 R, 22 A, 27, 421 R, 421 A, 412 R, 74/413; 49/352

See application file for complete search history.

(56) References Cited

U.S. PATENT DOCUMENTS

| | | | | |
|---|---|---|---|---|
| 4,161,298 A | * | 7/1979 | Davis | 242/530.3 |
| 4,504,159 A | * | 3/1985 | Hirano et al. | 400/148 |
| 4,541,160 A | * | 9/1985 | Roberts | 29/401.1 |
| 5,238,290 A | * | 8/1993 | Farmont | 296/216.03 |
| 5,823,499 A | * | 10/1998 | Ito et al. | 248/429 |
| 5,960,699 A | * | 10/1999 | Alaze | 92/129 |
| 6,056,219 A | * | 5/2000 | Barkley | 242/225 |
| 6,126,132 A | * | 10/2000 | Maue | 248/429 |
| 7,520,648 B2 | * | 4/2009 | Apfelbeck | 362/530 |
| 2006/0284450 A1 | * | 12/2006 | Regnier et al. | 296/216.01 |
| 2007/0182219 A1 | * | 8/2007 | Mori et al. | 296/223 |

FOREIGN PATENT DOCUMENTS

| | | |
|---|---|---|
| DE | 37 37 725 | 6/1987 |
| EP | 0 218 020 | 4/1987 |
| EP | 0 315 492 | 7/1988 |
| JP | 2005-240851 | 9/2005 |
| WO | WO 90/00986 | 2/1990 |

OTHER PUBLICATIONS

European Search Report dated Apr. 29, 2010.

* cited by examiner

*Primary Examiner* — Dennis H Pedder
(74) *Attorney, Agent, or Firm* — Finnegan, Henderson, Farabow, Garrett & Dunner, LLP

(57) ABSTRACT

A sunroof driving device includes a pair of rail members adapted to be arranged at both edges of a roof opening formed in a vehicle roof in a vehicle width direction and each extending along a vehicle longitudinal direction, a slide member slidably supported by each of the rail members in a longitudinal direction therof, a supporting member connected to the slide member and supporting a movable panel opening and closing the roof opening, a cross-connecting member extending along the vehicle width direction for establishing connection between respective front ends of the rail members, a drive motor arranged at the cross-connecting member and including a rotating shaft extending along the cross-connecting member, a torque wire extending along the cross-connecting member and integrally rotating with the rotating shaft, and a torque-transmitting member rotated by the torque wire and sliding the slide member along each of the rail members.

4 Claims, 5 Drawing Sheets

Vehicle width direction

DRIVE APPRATUS FOR SUNROOF

CROSS REFERENCE TO RELATED APPLICATIONS

This application is based on and claims priority under 35 U.S.C. §119 to Japanese Patent Application 2007-303200, filed on Nov. 11, 2007, the entire content of which is incorporated herein by reference.

FIELD OF THE INVENTION

The present invention relates to a sunroof driving device. More particularly, the present invention pertains to a sunroof driving device for opening and closing a movable panel adapted to be mounted on a roof opening portion formed in a vehicle roof.

BACKGROUND

A conventional sunroof driving device disclosed in JP2005-240851A includes a cross-connecting member establishing connection between respective front ends of a pair of rail members and a driving device arranged at the cross-connecting member. The driving device includes a drive motor and a spur wheel to which rotation of the drive motor is transmitted via reduction gears. The driving device is configured to transmit the rotation of the drive motor to the spur wheel, so that two rack belts engaging with the spur wheel are pulled in and out from casings accommodating the respective rack belts. Accordingly, slide members to which the rack belts are connected, respectively, slide along the respective rail members. Consequently, the driving device is configured so as to operate a movable panel provided at a roof opening portion formed in a vehicle roof.

As described above, the rack belts are accommodated in the respective casings so as to be pulled therein and therefrom. The rack belts provided at front and rear sides in a vehicle longitudinal direction engage with the spur wheel of the driving device. The casings extending along the total length of the cross-connecting member are provided at drive sides and at release sides of the rack belts, respectively. Accordingly, the cross-connecting member at which the driving device is arranged, requires space used for arranging the rack belts and the casings accommodating the rack belts, thereby increasing the sunroof driving device in size in vehicle longitudinal direction.

A need thus exists for a sunroof driving device, which is not susceptible to the drawback mentioned above.

SUMMARY OF THE INVENTION

According to an aspect of the present invention, a sunroof driving device includes a pair of rail members adapted to be arranged at both edges of a roof opening formed in a vehicle roof in a vehicle width direction and each extending along a vehicle longitudinal direction, a slide member slidably supported by each of the rail members in a longitudinal direction therof, a supporting member connected to the slide member and supporting a movable panel configured to open and close the roof opening in the vehicle roof, a cross-connecting member extending along the vehicle width direction for establishing connection between respective front ends of the rail members, a drive motor arranged at the cross-connecting member and including a rotating shaft extending along the cross-connecting member, a torque wire extending along the cross-connecting member and integrally rotating with the rotating shaft, and a torque-transmitting member rotated by the torque wire and sliding the slide member along each of the respective rail members according to the rotation of the torque wire.

BRIEF DESCRIPTION OF THE DRAWINGS

The foregoing and additional features and characteristics of the present invention will become more apparent from the following detailed description considered with reference to the accompanying figures, wherein.

DETAILED DESCRIPTION

Figure 1:
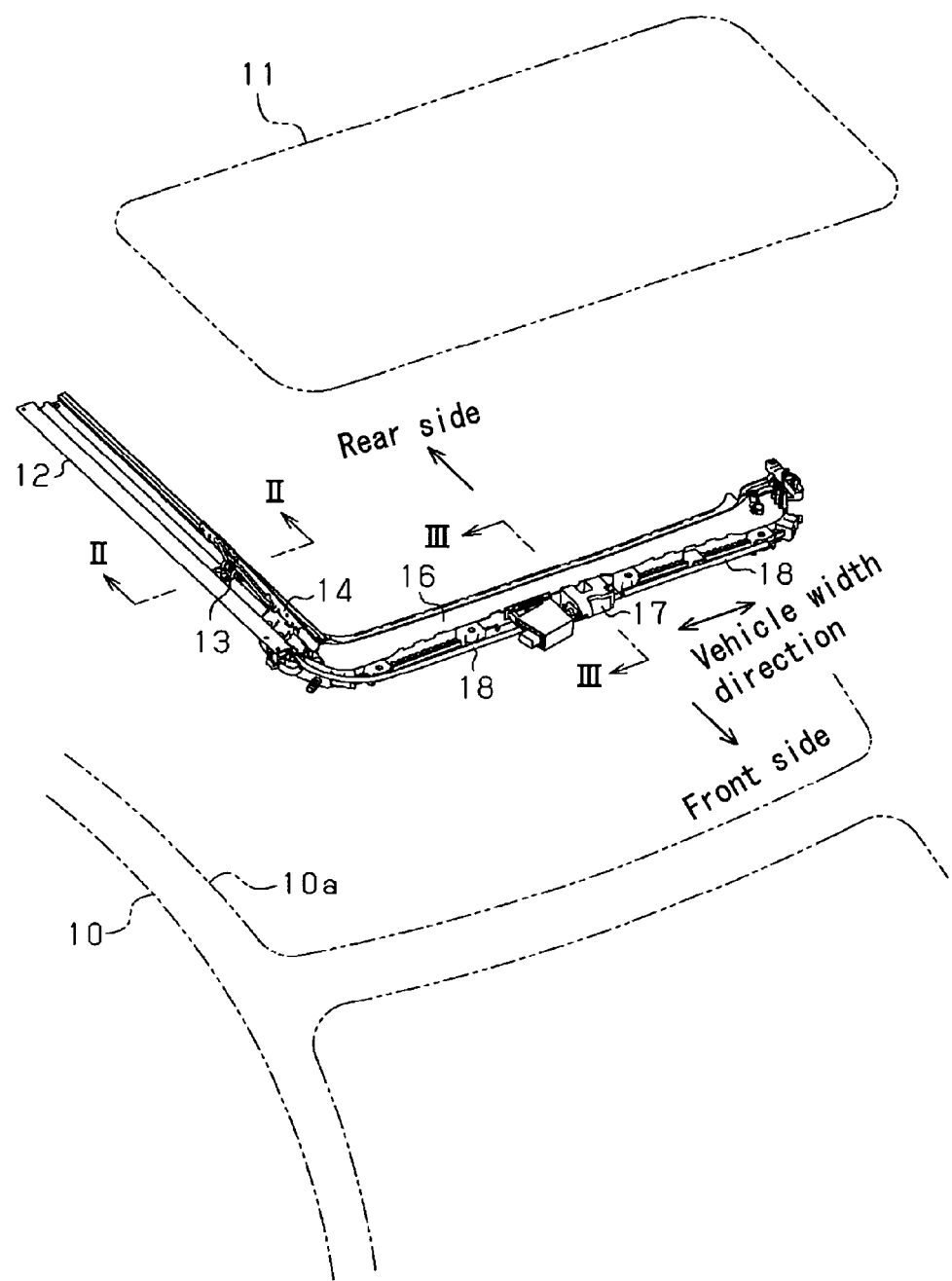
FIG. 1 is a perspective view illustrating a sunroof driving device according to a first embodiment of the present invention.

A first embodiment of the present invention of a sunroof driving device will be explained with reference to the illustrations of the figures as follows. FIG. 1 is a perspective view illustrating the sunroof driving device mounted on a vehicle roof 10. As illustrated in FIG. 1, a roof opening portion 10a is formed in the vehicle roof 10. Further, a movable panel 11 for opening and closing the roof opening portion 10a is mounted on the vehicle roof 10.

A pair of rail members 12 extending along a vehicle longitudinal direction is arranged at both right and left edges of the roof opening portion 10a in a vehicle width direction (only one of the rail members 12 is representatively shown in FIG. 1). Each of the rail members 12 is composed of an extruded material, for example, made of aluminum.

Figure 2:
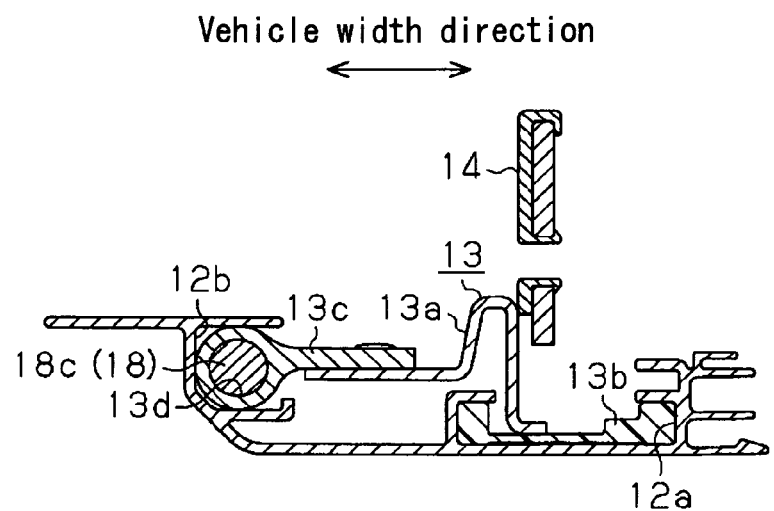
FIG. 2 is a cross-sectional view taken along line II-II of FIG. 1.

As illustrated in a cross-sectional view of FIG. 2 taken along line II-II of FIG. 1, each of the rail members 12 includes a predetermined area. The rail member 12 has a first guide member 12a and a second guide member 12b. The first guide member 12a is located at an interior side in the vehicle width direction and includes a C-shaped opening portion open toward an upward direction in the vehicle vertical direction. The second guide member 12b is located at an exterior side in the vehicle width direction and includes a C-shaped opening portion open toward the interior side in the vehicle width direction.

Sliders 13 each serving as a slide member are slidably supported by the respective rail members 12 in a longitudinal direction thereof. Each of the sliders 13 includes a main body portion 13a composed of a metal plate or the like, a shoe 13b made of resin or the like, and a nut portion 13c. The shoe 13b is attached to a lower end of the main body portion 13a and slidably mounted on the first guide portion 12a, thereby sliding therealong. The nut portion 13c is fixed to an end of the main body portion 13a, which is located at the exterior side in the vehicle width direction. Further, the nut portion 13c is slidably mounted on the second guide portion 12b, thereby sliding therealong. In addition, the nut portion 13c forms a cylindrical shape and includes a screw hole 13d penetrating the nut portion 13d therein in the vertical longitudinal direction.

Moreover, functional brackets 14 each composed of a metal plate or the like and serving as a supporting member are slidably supported by the respective rail members 12 in the longitudinal direction thereof. The sliders 13 are connected to the respective functional brackets 14 that support the movable panel 11. The functional brackets 14 are operated according to sliding movement of the sliders 13 along the longitudinal direction of the rail members 12, thereby operating the movable panel 11 to open and close the roof opening portion 10a. In addition, while the movable panel 11 is operated by the functional brackets 14 to open and close the roof opening portion 10a, the position of the movable panel 11 is controlled by the functional brackets 14 according to operation of appropriate cam mechanisms each established between each of the sliders 13 and each of the functional brackets 14.

Figure 3:
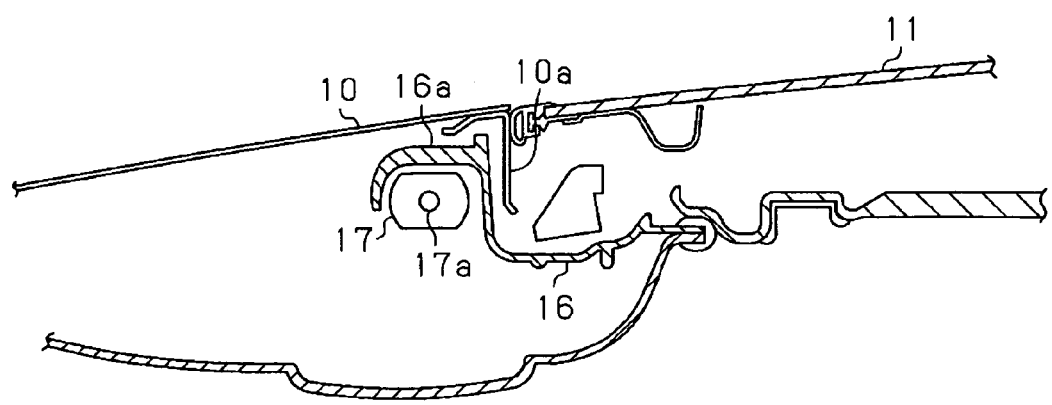
FIG. 3 is a cross-sectional view taken along line III-III of FIG. 1.

As illustrated in FIG. 1, a front housing 16 is arranged at a front edge of the roof opening portion 10a. The front housing 16 serves as a cross-connecting member establishing connection between respective front ends of the rail members 12 and extending along the vehicle width direction. As illustrated in FIG. 3, which shows a cross-sectional view taken along line III-III of FIG. 1, a holding member 16a having a cross-sectional visor shape is formed at a central part of the front housing 16 in a longitudinal direction thereof. A drive motor 17 is attached at a lower surface of the holding member 16a. The drive motor 17 includes a rotating shaft 17a having a rotational axis extending along the front housing 16.

Figure 4:
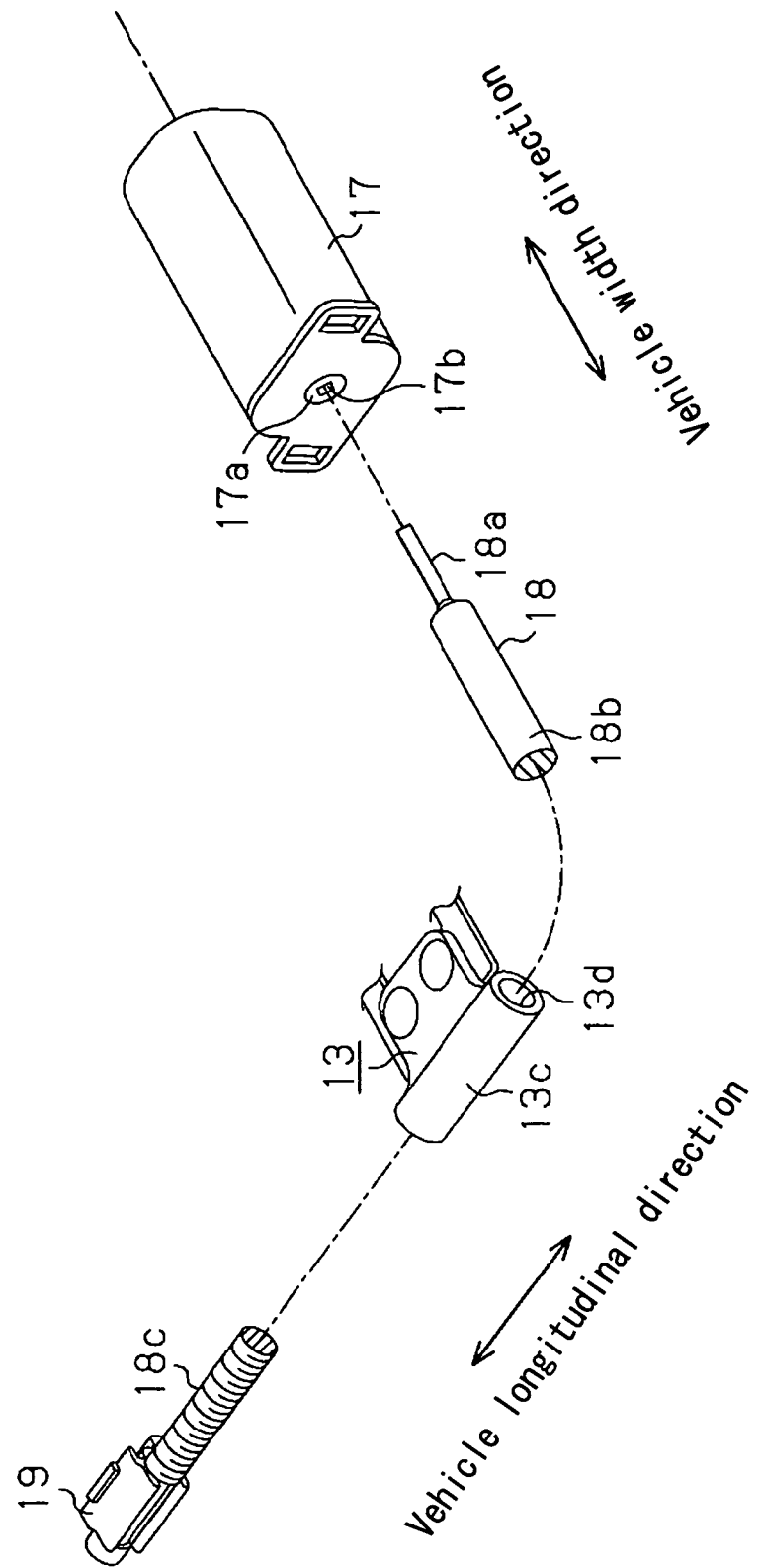
FIG. 4 is an exploded perspective view illustrating the first embodiment.

As illustrated in FIG. 4, the rotating shaft 17a has axial end faces exposed toward both outer sides of the drive motor 17 (only one of the end faces is shown in FIG. 4) and fitting holes 17b each having a square shaped recess axially formed in each of the end faces. Flexible shafts 18 are connected to the rotating shaft 17a so as to integrally rotate therewith. Each of the flexible shafts 18 has a square shaped fitting portion 18a fitting each of the fitting holes 17b.

The flexible shaft 18 includes a shaft portion 18b serving as a torque wire extending along the front housing 16 and a screw shaft 18c extending along the rail member 12. A front end of the screw shaft 18c makes a continuous connection with the shaft portion 18b. That is, the screw shaft 18c is actuated by the shaft portion 18b so as to integrally rotate therewith at the front end of the rail member 12. Each shaft-bearing portion 19 is provided to the screw shaft 18c (see FIG. 1). A distal end of the screw shaft 18c is rotatably supported by the shaft-bearing portion 19 so as not to move in an axial direction. The screw shaft 18c of the flexible shaft 18 engages with the screw hole 13d of the slider 13. The screw shaft 18c and the screw hole 13d configure a torque-transmitting member.

In addition, the screw shafts 18c (and the screw holes 13d) provided at both right and left sides on the vehicle roof 10 in the vehicle width direction are a right-handed screw and a left-handed screw, respectively. Rotation of the rotating shaft 17a of the drive motor 17 in one direction allows the sliders 13 provided at the right and left sides on the vehicle roof 10 to slide in the same direction along the rail members 12 due to screw fitting actions. Each screw fitting action occurs between the screw hole 13d and the screw shaft 18c according to the rotation of the screw shaft 18c as described above. As mentioned previously, the functional brackets 14 are actuated according to the sliding movement of the sliders 13 along the rail members 12, thereby operating the movable panel 11 to open and close the roof opening portion 10a.

As explained above, the following effects may be obtained according to the first embodiment. The torque-transmitting members each configured by the screw shaft 18c and the screw hole 13d and provided at the right and left sides on the vehicle roof 10 generate the sliding movement of the sliders 13. Further, the torque-transmitting members are substantially driven by a single drive shaft configured by the rotating shaft 17a of the drive motor 17 and the shaft portions 18b integrally rotating with the rotating shaft 17a. Accordingly, the front housing 16 requires space for arranging the drive motor 17 and the shaft portions 18b only. Consequently, the front housing 16 may be minimized in size, thereby reducing the size of the sunroof driving device as a whole.

Further, according to the first embodiment, the sliders 13 slide along the respective rail members 12 in the longitudinal direction thereof due to the screw fitting actions each occurring between the screw hole 13d and the screw shaft 18c engaging with the screw hole 13d according to the rotation of the screw shaft 18c. In this way, each of the torque-transmitting members generating the sliding movement of the sliders 13 is simply composed of the screw shaft 18c and the screw hole 13d. Accordingly, the number of components of the torque-transmitting member may be reduced. In particular, the shaft portion 18b is integrally formed with the screw shaft 18c, thereby further reducing the number of components.

Moreover, rack belts engaging with a spur wheel of a driving device are not applied in the sunroof driving device according to the first embodiment. Vibrations caused when the rack belts are pulled out from casings each accommodating the respective rack belts do not occur in the first embodiment, so that possibilities of occurrence of vibrations may be reduced in the first embodiment when the sunroof driving device is operated. A sunroof driving device according to a second embodiment of the present invention will be described with reference to the illustrations of the figures as follows. In addition, the sunroof driving device in the second embodiment is different from the sunroof driving device of the first embodiment only in that torque-transmitting members allowing the slide movement of the sliders 13 (slide members) are modified. Detailed explanations of similar features of the second embodiment are omitted.

Figure 5:
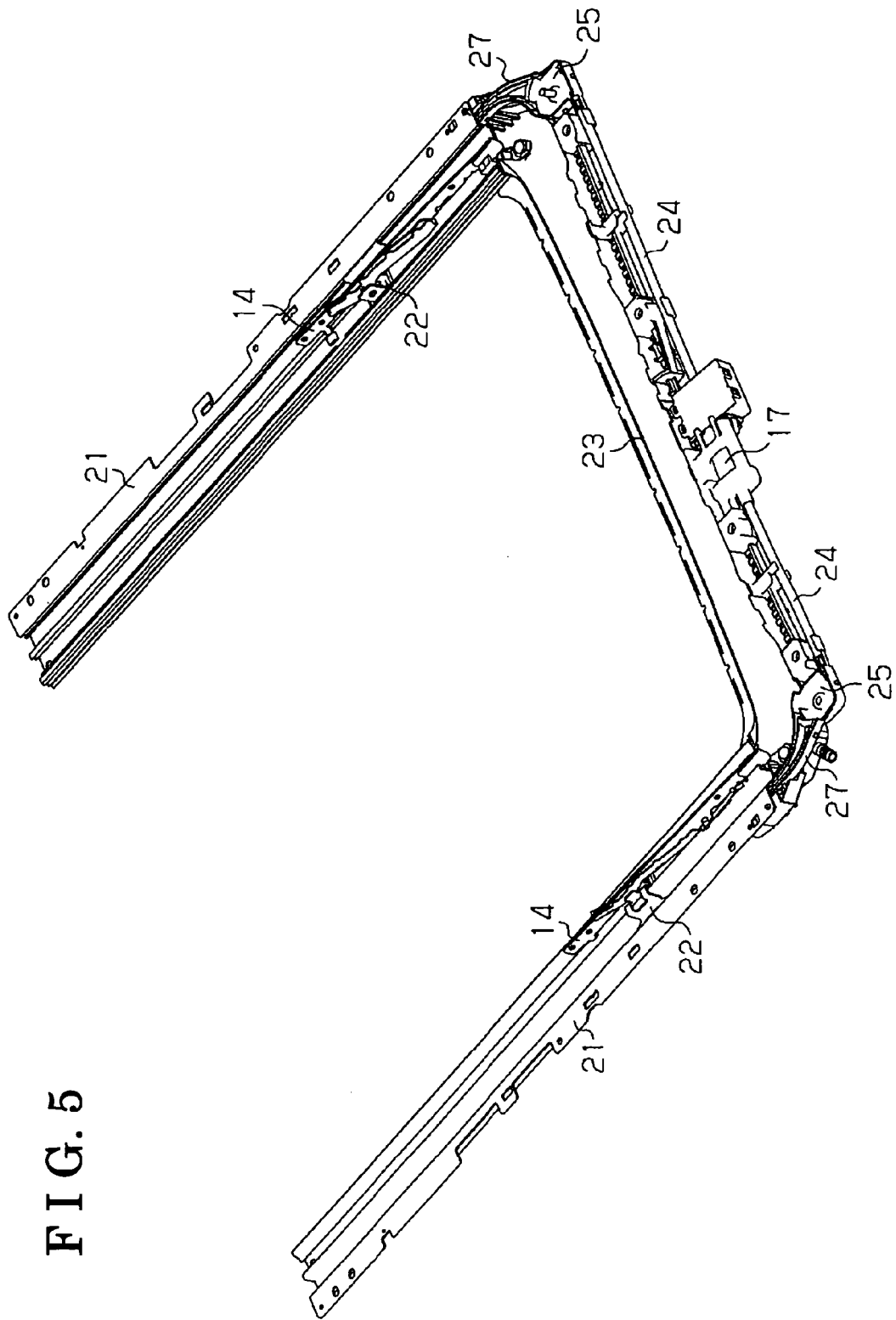
FIG. 5 is a perspective view illustrating a sunroof driving device according to a second embodiment of the present invention.
Figure 6:
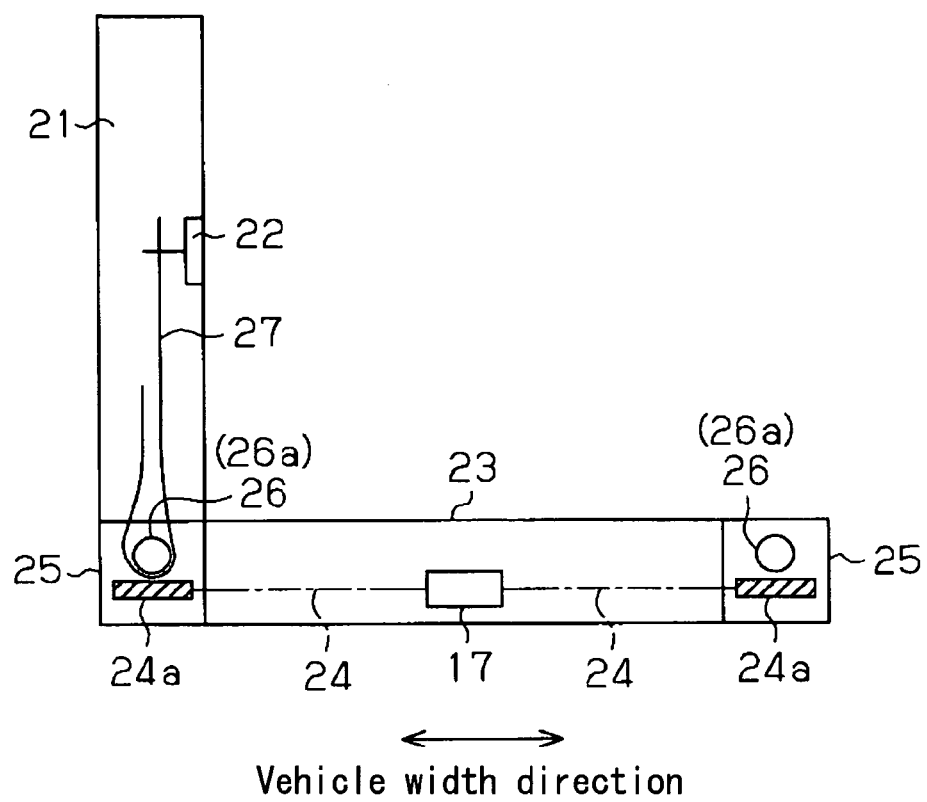
FIG. 6 is a plan view schematically illustrating the second embodiment.

FIG. 5 and FIG. 6 are a perspective view and a schematic plan view, respectively, illustrating the sunroof driving device according to the second embodiment. As illustrated in FIG. 5 and FIG. 6, a pair of rail members 21 extends along the vehicle longitudinal direction. Sliders 22 each serving as a slide member are slidably supported by the respective rail members 21 in a longitudinal direction thereof.

Furthermore, a front housing 23 is arranged at a front edge of the opening portion (10a). The front housing 23 serves as a cross-connecting member establishing connection between respective front ends of the rail members 21 and extends along the vehicle width direction. The drive motor 17 is attached to the front housing 23 at the central portion in a longitudinal direction thereof. Torque wires 24 are connected to the rotating shaft 17a of the drive motor 17 so as to integrally rotate with the rotating shaft 17a in the same way as the configuration of the first embodiment (see FIG. 4). In addition, each of the torque wires 24 extends along the front housing 23. Worms 24a are provided at respective distal ends of the torque wires 24.

Gear boxes 25 are arranged at the respective front ends of the rail members 21 (at both ends of the front housing 23 in the vehicle width direction). Each of the gear boxes 25 includes the worm 24a and a worm wheel 26 engaging with the worm 24a. The worm 24a is rotatably accommodated in the gear box 25 while the worm wheel 26 is accommodated in the gear box 25 and rotatably connected therein. That is, the worm wheel 26 engaging with the worm 24a is rotated by the torque wire 24 (worm gear 24a) at the front end of the rail member 21 according to the rotation of the torque wire 24. The worm 24a and the worm wheel 26 configure a worm gear serving as a reduction gear.

A spur wheel 26a is formed coaxially and integrally with the above-mentioned worm wheel 26. Lack belts 27 are provided so as to extend along the rail members 21, respectively. Each of the lack belts 27 engages with the worm wheel 26a. One end of the rack belt 27 is connected to the slider 22. Accordingly, when the worm wheel 26 accommodated in the gear box 25 rotates integrally with the spur wheel 26a, the rack belt 27 engaging with the spur wheel 26a is pulled in and out. Consequently, the sliders 22 connected to the respective rack belts 27 slide along the rail members 21. The functional brackets 14 are operated according to the sliding movement of the sliders 22, thereby operating the movable panel 11 to open and close the roof opening portion 10a as described previously. In addition, the spur wheel 26a and the rack belt 27 configure a torque-transmitting member. In particular, the torque-transmitting member includes the reduction gear and a driving force transmitting member. The reduction gear reducing rotations of the torque wire 24 outputs the reduced rotations from its output shaft that is the worm wheel 26. The driving force transmitting members extending along the respective rail members 21 are rotated by the respective torque wires 24, thereby converting the rotations outputted from the respective worm wheels 26 (each serving as the output shaft of the reduction gear) into linear movements. Accordingly, the linear movements are transmitted to the sliders 22, so that the sliders 22 slide along the respective rail members 21.

As described above, according to the second embodiment of the sunroof driving device, the following effects may be obtained in addition to the effects of the first embodiment. The rail members 21 supporting the respective sliders 22 connected to the respective spur wheels 26a and the respective rack belts 27 are easily separated from the front housing 23 to which the drive motor 17 and the torque wires 24 are arranged, via the respective gear boxes 25 (each configured as the reduction gear including the worm 24a and the worm wheel 26). Accordingly, when components of the front housing 23 and components of the rail members 21 are established as discrete assembly parts, the versatility of the assembly parts is expanded by modifying the combination of such discrete assembly parts according to vehicle types.

In addition, the first embodiment may be modified as follows. Each of the flexible shafts 18 may be configured by connecting the discrete shaft portion 18b with the discrete screw shaft 18c to rotate integrally with each other.

In the second embodiment, the rotation of the worm wheels 26 (each serving as the output shaft of the reduction gear) may be converted into the linear movements, for example, by pulleys rotating integrally with the respective worm wheels 26 and push-pull cables each having one end locked to the pulley and the other end locked to the slider 22. Alternatively, the rotations outputted from the worm wheels 26 may converted into the linear movements by means of pulleys integrally rotating with the respective worm wheels 26, idle pulleys provided at respective rear ends of the rail members 21, and wires each connected between the pulley and the idle pulley while connected to the slider 22.

In the second embodiment, the gear boxes 25 (reduction gears) may be assembled to the front housing 23 or to the respective rail members 21.

As described above, with the configuration of the first embodiment, the torque-transmitting members (each configured by the screw shaft 18c and the screw hole 13d, by the spur wheel 26a and the rack belt 27) generating the sliding movement of the sliders 13, 22 are substantially driven by the single drive shaft configured by the rotating shaft 17a of the drive motor 17 and the torque wires 18b, 24 integrally rotating with the rotating shaft 17a. Accordingly, the front housing 16, 23 requires space for arranging the drive motor 17 and the torque wires (shaft portions 18b, torque wires 24) only. Consequently, the size of the front housing 16, 23 is minimized in the vehicle longitudinal direction, so that the size of the sunroof driving device is reduced as a whole.

In the sunroof driving device according to the first and second embodiments, the aforementioned torque-transmitting members (18c and 13d, 26a and 27) are rotated by the torque wires (18b, 24) at the respective front ends of the rail members 12, 21.

Further, in the sunroof driving member according to the first embodiment, each of the torque transmitting members includes the screw shafts 18c integrally rotating with the respective torque wires 18b and the screw holes 13d provided in the respective sliders 13 and engaging with the respective screw shafts 18c.

Accordingly, the sliders 13 slides along the respective rail members 12 in the longitudinal direction thereof due to the screw fitting actions each occurring between the screw shaft 18c and the screw hole 13d engaging with the screw hole 13d along with the rotation of the screw shaft 18c. Thus, each of the torque-transmitting members generating the sliding movement of the sliders 13 is simply configured by the screw shaft 18c and the screw hole 13d. Accordingly, the number of components of the torque-transmitting member is reduced.

In the sunroof driving member according to the second embodiment, the torque-transmitting members (each configured by 26a and 27) are provided at the respective front ends of the rail members 21. Each of the torque-transmitting members includes the reduction gear (including the worm 24a and the worm wheel 26) and the driving force transmitting member (configured by the spur wheel 26a and the rack belt 27). The reduction gear reduces the rotations of the torque wire 24 and outputs the reduced rotations from the output shaft that is the worm wheel 26. The driving force transmitting member converts the rotations from the output shaft into the linear movement, transmits the linear movement to the slider 22, and slides the slider 22 along the rail member 21 in the vehicle longitudinal direction.

Accordingly, the rail members 21 supporting the respective sliders 22 connected to the respective torque-transmitting members are easily separated from the front housing 23 to which the drive motor 17 and the torque wires 24 are arranged, via the respective gear boxes 25 (reduction gears). Accordingly, when components of the front housing 23 and components of the rail members 21 are established as discrete assembly parts, the versatility of the assembly parts is expanded by modifying the combination of such discrete assembly parts according to vehicle types.

According to an aspect of the present invention, a sunroof driving device includes a pair of rail members adapted to be arranged at both edges of a roof opening formed in a vehicle roof in a vehicle width direction and each extending along a vehicle longitudinal direction, a slide member slidably supported by each of the rail members in a longitudinal direction therof, a supporting member connected to the slide member and supporting a movable panel configured to open and close the roof opening in the vehicle roof, a cross-connecting member extending along the vehicle width direction for establishing connection between respective front ends of the rail members, a drive motor arranged at the cross-connecting member and including a rotating shaft extending along the cross-connecting member, a torque wire extending along the cross-connecting member and integrally rotating with the rotating shaft, and a torque-transmitting member rotated by the torque wire and sliding the slide member along each of the respective rail members according to the rotation of the torque wire.

With the configuration as described above, the torque-transmitting member generating sliding movement of the slider is substantially driven by a single drive shaft configured by the rotating shaft of the drive motor and the torque wire integrally rotating with the rotating shaft. Accordingly, the cross-connecting member requires space for arranging the drive motor and the torque wire only. Consequently, the size of the cross-connecting member is minimized in the vehicle longitudinal direction, so that the size of the sunroof driving device is reduced as a whole.

In the sunroof driving device according to the present invention, the aforementioned torque-transmitting member is rotated by the torque wire at each of the respective front ends of the rail members.

Further, in the sunroof driving member according to the present invention, the torque transmitting member includes a screw shaft integrally rotating with the torque wire and a screw hole provided in the slider and engaging with the screw shaft.

Accordingly, the slider slides along each of the respective rail members in the longitudinal direction thereof due to a screw fitting action occurring between the screw shaft and the screw hole engaging with the screw hole along with the rotation of the screw shaft. Thus, the torque-transmitting member generating the sliding movement of the slider is simply configured by the screw shaft and the screw hole. Accordingly, the number of components of the torque-transmitting member is reduced.

In the sunroof driving member according to the second embodiment, the torque-transmitting member is provided at each of the respective front portions of the rail members. The torque-transmitting member includes a reduction gear and a driving force transmitting member. The reduction gear reduces rotations of the torque wire and outputs the reduced rotations from an output shaft. The driving force transmitting member converts the rotations from the output shaft into a linear movement, transmits the linear movement to the slider, and slides the slider along each of the respective rail members in the vehicle longitudinal direction. The driving force transmitting member is preferably a rack belt.

Accordingly, each of the rail members supporting the slider connected to the torque-transmitting member is easily separated from the cross-connecting member to which the drive motor and the torque wire are arranged, via the reduction gear. Accordingly, when components of the cross-connecting member and components of the rail members are established as discrete assembly parts, the versatility of the assembly parts is expanded by modifying the combination of such discrete assembly parts according to vehicle types.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A sunroof driving device, comprising:
a pair of first and second rail members adapted to be arranged at both edges of a roof opening formed in a vehicle roof in a vehicle width direction and each extending in a vehicle longitudinal direction;
first and second slide members supported on the first rail member and the second rail member, respectively, for sliding movement therealong in the vehicle longitudinal direction;
first and second supporting members connected to the first slide member and the second slide member, respectively, the first supporting member and the second supporting member supporting a movable panel configured to open and close the roof opening in the vehicle roof;
a cross-connecting member extending in the vehicle width direction and connecting a front end of the first rail member and a front end of the second rail member;
a drive motor arranged on the cross-connecting member and including a rotating shaft with first and second opposite ends, the rotating shaft extending in the vehicle width direction; and
a pair of first and second flexible shafts, each being formed as a one-piece structure of a torque wire and a torque-transmitting member,
the torque wire of the first flexible shaft extending in the vehicle width direction along the cross-connecting member, the torque wire of the first flexible shaft having an end portion that is in direct connection with the first end of the rotating shaft of the drive motor,
the torque wire of the second flexible shaft extending in the vehicle width direction along the cross-connecting member, the torque wire of the second flexible shaft having an end portion that is in direct connection with the second end of the rotating shaft of the drive motor,
the torque transmitting member of the first flexible shaft extending along the first rail member and being in threadable engagement with the first slide member,
the torque transmitting member of the second flexible shaft extending along the second rail member and being in threadable engagement with the second slide member,
wherein when the drive motor is turned on, the resulting rotation of the rotating shaft causes the first torque-transmitting member and the second torque-transmitting member to rotate, thereby moving the first slide member and the second slide member, the first supporting member on the first slide member, the second supporting member on the second slide member, and the movable panel mounted on both the first supporting member and the second supporting member.

2. The sunroof driving device according to claim 1, wherein the first end and the second end of the rotating shaft of the drive motor have rectangular holes, respectively, the first torque wire and the second torque wire have rectangular fitting ends received in the rectangular holes, respectively, of the rotating shaft of the driver motor.

3. The sunroof driving device according to claim 1, wherein the rotating shaft is recessed in the drive motor.

4. The sunroof driving device according to claim 2, wherein the rotating shaft is recessed in the drive motor.

* * * * *